(12) United States Patent
Keene et al.

(10) Patent No.: US 7,202,661 B2
(45) Date of Patent: Apr. 10, 2007

(54) APPARATUS AND METHOD FOR ESTABLISHING THE POSITIONS OF METAL OBJECTS IN AN INPUT STREAM

(75) Inventors: Mark N Keene, Malvern (GB); Mathew C McKie, Nottingham (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 10/573,251

(22) PCT Filed: Sep. 16, 2004

(86) PCT No.: PCT/GB2004/003953

§ 371 (c)(1),
(2), (4) Date: Apr. 20, 2006

(87) PCT Pub. No.: WO2005/028129

PCT Pub. Date: Mar. 31, 2005

(65) Prior Publication Data

US 2007/0007953 A1    Jan. 11, 2007

(30) Foreign Application Priority Data

Sep. 23, 2003  (GB) ................. 0322224.7

(51) Int. Cl.
*G01R 33/02* (2006.01)
*G01N 27/00* (2006.01)
(52) U.S. Cl. ................. 324/239; 324/244; 324/260
(58) Field of Classification Search ............... 324/239, 324/244, 260
See application file for complete search history.

(56) References Cited

FOREIGN PATENT DOCUMENTS

EP   03 53 035    1/1990
EP   0 541 403    5/1993

(Continued)

OTHER PUBLICATIONS

International Search Report for PCT/GB2004/003953 dated Nov. 17, 2004.

(Continued)

*Primary Examiner*—Bot LeDynh
(74) *Attorney, Agent, or Firm*—Nixon & Vanderhye P.C.

(57) ABSTRACT

Apparatus (10) for establishing the positions of metal objects in a mixed input stream of both metal and non-metal objects, the apparatus comprising a differential metal-detecting coil (14A) having a first coil portion wound in a first sense and a second coil portion of generally similar shape and size to the first, wound in a second sense opposite to the first sense, and conveying means (11) for moving objects with respect to, and past, the differential metal-detecting coil in a plane and in a direction with unit vector â, characterised in that the second coil portion is displaced from the first coil portion by a displacement B having a component in the plane in a direction with unit vector b̂, wherein $$0 < \cos^{-1} â \cdot \hat{b} < \frac{\pi}{2},$$

and in that the apparatus further comprises analysing means for analysing the form of the output voltage of the coil as a function of time to establish the position of said metal objects in a direction ĉ in the plane, where ĉ is defined by â·ĉ=0.

11 Claims, 7 Drawing Sheets

FOREIGN PATENT DOCUMENTS

| | | |
|---|---|---|
| EP | 0 876 852 | 11/1998 |
| EP | 1 433 541 | 6/2004 |
| GB | 1 009 724 | 11/1965 |
| JP | 5-5784 | 1/1993 |
| JP | 5-223947 | 9/1993 |

OTHER PUBLICATIONS

GB Search Report for GB 0322224.7 dated Feb. 27, 2004.

APPARATUS AND METHOD FOR ESTABLISHING THE POSITIONS OF METAL OBJECTS IN AN INPUT STREAM

This application is the U.S. national phase of international application PCT/GB2004/003953, filed 16 Sep. 2004, which designated the U.S. and claims priority of GB 0322224.7, filed 23 Sep. 2003, the entire contents of each of which are hereby incorporated by reference.

The present invention relates to apparatus for establishing the positions metal objects in a mixed input stream of both metal and non-metal objects, and particularly (although not exclusively) to establishing the positions of metal objects in a mixed-waste input stream. Mixed-waste streams are encountered, for example, during reclamation of recyclable objects from unsorted household waste.

The removal of metallic content in a waste stream and sorting between ferrous and non-ferrous objects are important steps in the recovery of metals in material reclamation facilities (MRFs).

In a known type of apparatus, establishment of the positions of metal objects in a mixed input stream on a moving conveyor, and subsequent separation of the metal objects, is achieved by use of one or more metal detectors to detect the metal objects, and a rejection mechanism which receives signals from the one or more metal detectors and effects separation in response to the signals. An example is the apparatus disclosed in U.S. Pat. No. 4,541,530. Various rejection mechanisms are known, for example air separators, flap gates, or means to stop or reverse the conveyor to allow removal of detected metal objects.

Typically, a series of discrete metal detectors is arranged across the width of the conveyor, and output signals from the metal detectors are processed to give positional information on metal objects to be separated. Each detector has associated with it processing circuitry to interpret its output and to provide control signals to a rejection mechanism. To efficiently and accurately establish the position of metal objects in a mixed input stream, a high linear density of detectors across the conveyor is required, and consequently a large number of detectors and a large amount of electronic hardware is needed in order to process output signals from each of the detectors because the effective detecting width of a single detector is limited. This is disadvantageous both in terms of cost and complexity.

It is an object of the invention to ameliorate the aforementioned problems.

According a first aspect of the present invention, this object is achieved by apparatus according to claim 1 comprising a differential metal-detecting coil having a first coil portion wound in a first sense and a second coil portion of generally similar shape and size to the first, wound in a second sense opposite to the first sense, and conveying means for moving objects with respect to, and past, the differential metal-detecting coil in a plane and in a direction with unit vector $\hat{a}$, characterised in that the second coil portion is displaced from the first coil portion by a displacement B having a component in the plane in a direction with unit vector $\hat{b}$, wherein $$0 < \cos^{-1}\hat{a}\cdot\hat{b} < \frac{\pi}{2},$$

and in that the apparatus further comprises analysing means for analysing the form of the output voltage of the coil as a function of time to establish the position of said metal objects in a direction $\hat{c}$ in the plane, where $\hat{c}$ is defined by $\hat{a}\cdot\hat{c}=0$.

A metal object passing one coil portion of a differential metal-detecting coil will induce a signal in the coil that is opposite in polarity to that produced if the metal had passed the other coil portion. A metal object passing both coil portions induces an EMF which changes polarity as it passes the coil. Analysis of the form of the signal induced in a given metal detector coil as a function of time when a metal object passes the detector therefore provides positional information relating to the metal object; such information may then be used in extracting the metal object from the waste stream, if required. A single differential metal detector coil is thus effectively used as two distinct receivers by displacing the coil portions of each coil as described above.

The invention provides the advantage that the detecting width of a single receiver coil is increased without detriment to the quality of positional information generated by the coil, and hence in a system of the invention having a linear array of receiver coils, the number of such coils is reduced compared to prior art apparatus. Furthermore the amount of electronic processing hardware associated with the array is reduced compared to prior art apparatus, due to the reduced number of receiver coils.

Preferably, $B\cdot\hat{a}\geq t$, where t is the dimension of a coil portion in the $\hat{a}$ direction, and $$\frac{s}{2} \leq B\cdot\hat{c} \leq s,$$

where s is the dimension of a coil portion in a direction with unit vector $\hat{c}$ defined by $\hat{a}\cdot\hat{c}=0$, because this geometry provides a significant improvement in the detecting width of receiver coil, whilst at the same time providing for unambiguous signals to be induced in the receiver coils. Also, this avoids overlapping coil portions.

Conveniently, the analysing means comprises means for identifying voltages of different polarities, and for ascribing voltages of a first polarity to one coil portion and voltages of a second polarity, opposite to the first, to the other coil portion.

Preferably the apparatus comprises a plurality of such differential metal-detecting coils arranged in a linear array substantially in the $\hat{c}$ direction, thus allowing an input stream of substantial width to be processed.

The apparatus may incorporate a transmitter coil, if appropriate (e.g. non-ferrous objects must have eddy currents induced in them order that they may be detected by a receiver coil). If a transmitter coil is required, preferably a single coil is arranged around the one or more metal-detecting receiver coils, as this provides a simpler arrangement than is found in prior art systems, which employ a separate transmitter coils for each receiver coil. Multiple transmitter coils are difficult to synchronise in practice.

Conveniently, the differential metal-detecting coils may be formed by metal tracks on individual printed circuits boards (PCBs). The differential metal-detecting coils may also be formed on a single PCB. A single PCB may support both the differential metal-detecting coils and a single transmitter coil, and also electronic hardware for analysing signals from the transmitter coils.

A second aspect of the invention provides a metal-detector array comprising a plurality of differential metal-detecting coils, the array extending in a direction with unit vector $\hat{x}$, and each metal-detecting coil having a first coil portion (15) wound in a first sense and a second coil portion (16) of generally similar shape and size to the first, wound in a second sense opposite to the first, characterised in that, in at least one metal-detecting coil, the second coil portion thereof is displaced from the first coil portion thereof by a displacement B such that the two coil portions are substantially in the same plane and $$0 < \cos^{-1} \hat{b} \cdot \hat{x} < \frac{\pi}{2}$$

where $\hat{b}$ is a unit vector defined by $B \cdot \hat{b} = |B|$, and in that the system further comprises, in respect of that or those metal-detecting coil or coils, analysing means for analysing the form of the output voltage of those coil or coils as a function of time to establish the position, along the direction $\hat{x}$, of metal objects when said objects are moving past the array substantially in a direction with unit vector $\hat{y}$ where $\hat{x} \cdot \hat{y} = 0$.

Such an array has a reduced number of individual detecting coils compared to prior art arrays of differential metal-detecting coils, and is therefore cheaper and less complex than such prior art arrays whilst simultaneously being capable of yielding the same level of positional information regarding metal objects passing the array, or past which the array is moved.

Embodiments of the invention are described below by way of example only and with reference to the accompanying drawings in which.

Figure 1:
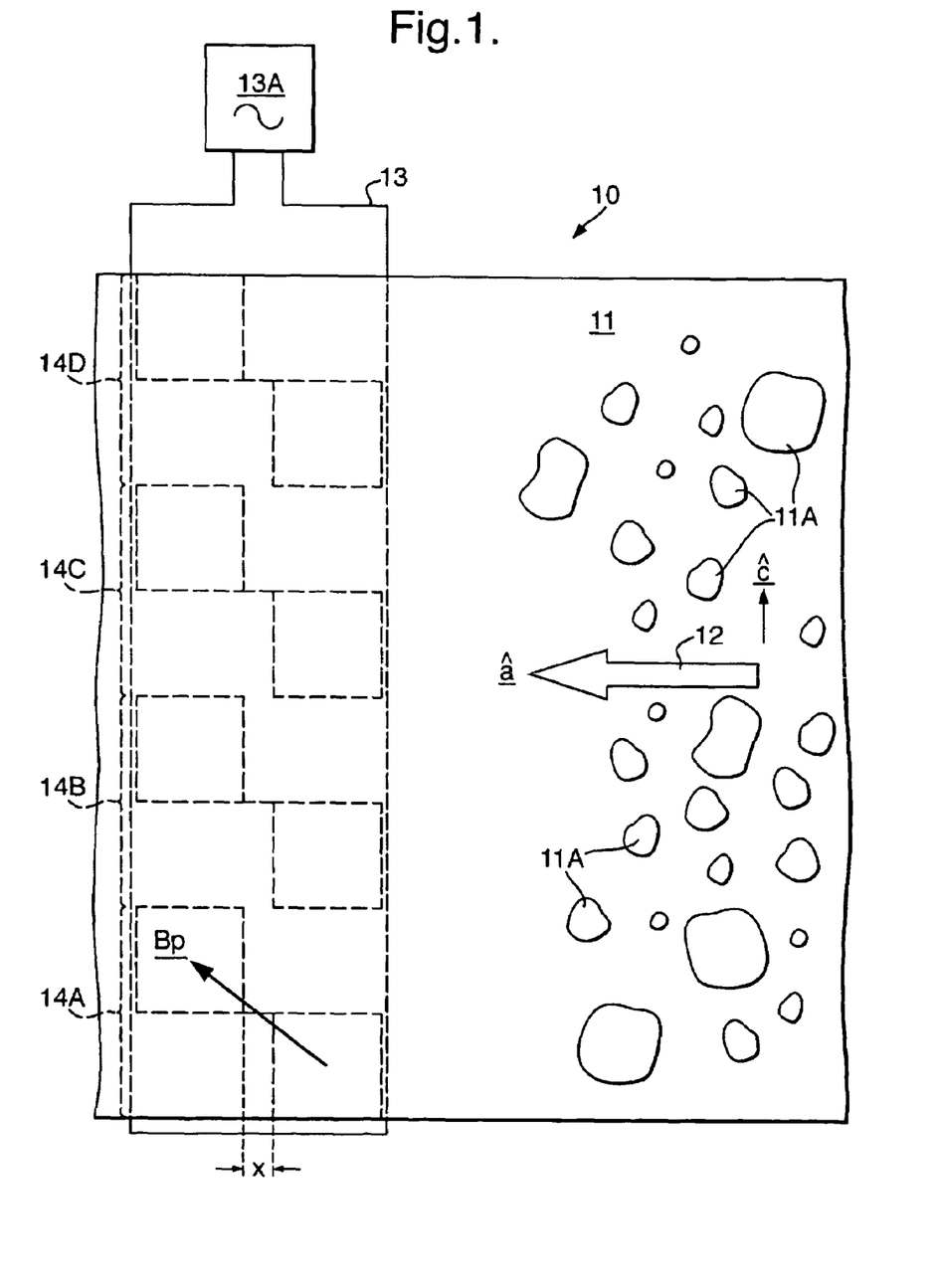
FIG. 1 shows a plan view of an apparatus of the invention.

FIG. 1 shows a plan view of an apparatus of the invention, for separating metal objects from a mixed input stream of both metal and non-metal objects, indicated generally by 10. The apparatus 10 comprises a conveyor belt 11, operable to carry material 11A, such as unsorted household waste, in the plane of the conveyor belt 11 in a direction 12 having a unit vector $\hat{a}$ towards and past a series of substantially identical metal-detecting receiver coils 14A, 14B, 14C, 14D which are arranged across the width of the conveyor belt 11 and are positioned below the belt 11 to form a linear metal-detector array. The apparatus 10 further comprises electronic processing hardware (not shown in FIG. 1 but shown in FIG. 4) for processing signals from the metal-detector array and generating appropriate control signals corresponding to positions of metal objects on the conveyor 11. The apparatus 10 may further comprise rejection means (not shown) for effecting rejection of the metal objects from the mixed input stream in response to the control signals if it is desired to additionally carry out rejection/extraction of metal objects whose position in the input stream has been established. A direction normal to $\hat{a}$ is indicated in FIG. 1 by a unit vector $\hat{c}$ in the plane of the belt 11. The component $B_p$ of B in the plane of the belt 11 is in a direction having unit vector $\hat{b}$ (i.e. $B_p = B_p \hat{b}$).

Figure 2:
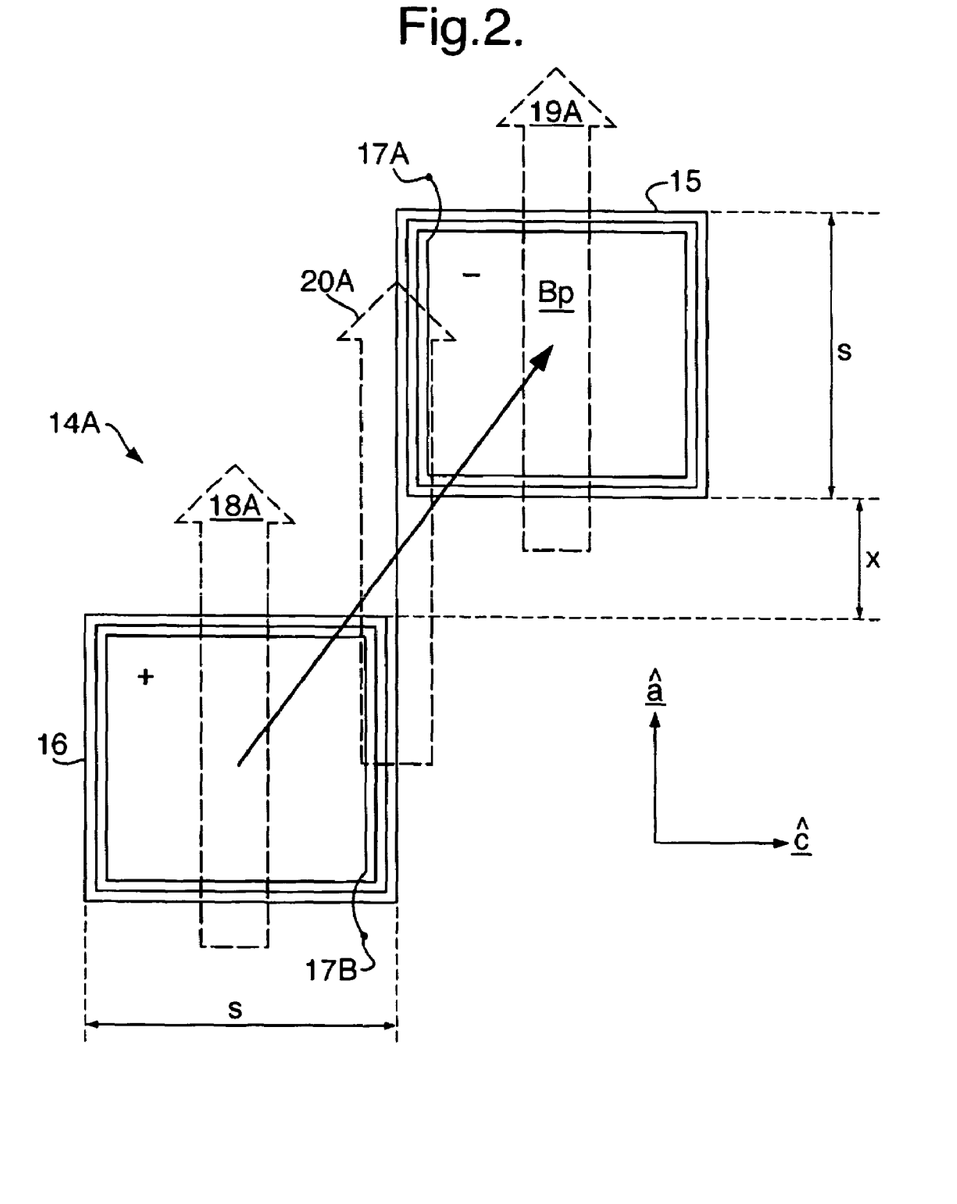
FIG. 2 shows in detail a metal-detecting receiver coil of the FIG. 1 apparatus.

FIG. 2 shows receiver coil 14A in detail. The receiver coil 14A comprises two square coil portions 15, 16 of side s, one 15 of which is displaced with respect to the other 16 by a displacement B. The component of B in the plane of the conveyor belt 11 is $B_p$ (=$B_p \hat{b}$). The coil portion 15 is displaced from the coil portion 16 in the $\hat{a}$ direction by a distance s+x, where x=s/4, and by a distance s in the $\hat{c}$ direction, i.e $B_p \cdot \hat{a} = s+x = 5s/4$ and $B_p \cdot \hat{c} = s$. The two coil portions 15, 16 of the coil 14A are wound in opposite senses to form a differential coil. In this example apparatus 10, the receiver coils 14A, 14B, 14C, 14D are each formed by metal tracks on a printed circuit board (PCB) and the turns of the coils are in the surface plane of the PCB. Multi-layer PCBs with spiral tracks on each layer may be used to increase the number of turns for a given coil portion area, as shown, for example, in U.S. Pat. No. 6,429,763. As a further step of integration, all of the receiver coils 14A, 14B, 14C, 14D and all electronic processing hardware of the apparatus 10 may be co-located on a single PCB for simplicity and ease of construction.

Referring again to FIG. 1, the apparatus 10 further comprises a transmitter coil 13 (positioned below the conveyor belt 11 and around the detecting coils 14A, 14B, 14C, 14D) and an oscillator 13A for generating a time-varying transmitted magnetic field in the region of the coils 14A, 14B, 14C, 14D. Together with the coils 14A, 14B, 14C, 14D, the transmitter coil 13 and the oscillator 13A form a linear array of differential metal-detectors, each of which has a substantially zero response to the transmitted field because EMFs generated in respective coil portions of a receiver coil, such as 14A, have substantially equal magnitude, but opposite polarity. However, the transmitted field induces eddy currents in metal objects on the conveyor belt 11 and near the transmitter coil 13A; magnetic fields associated with these eddy currents are detected by the receiver coils 14A, 14B, 14C, 14D, i.e. EMFs are induced in the receiver coils 14A, 14B, 14C, 14D.

Figure 3:
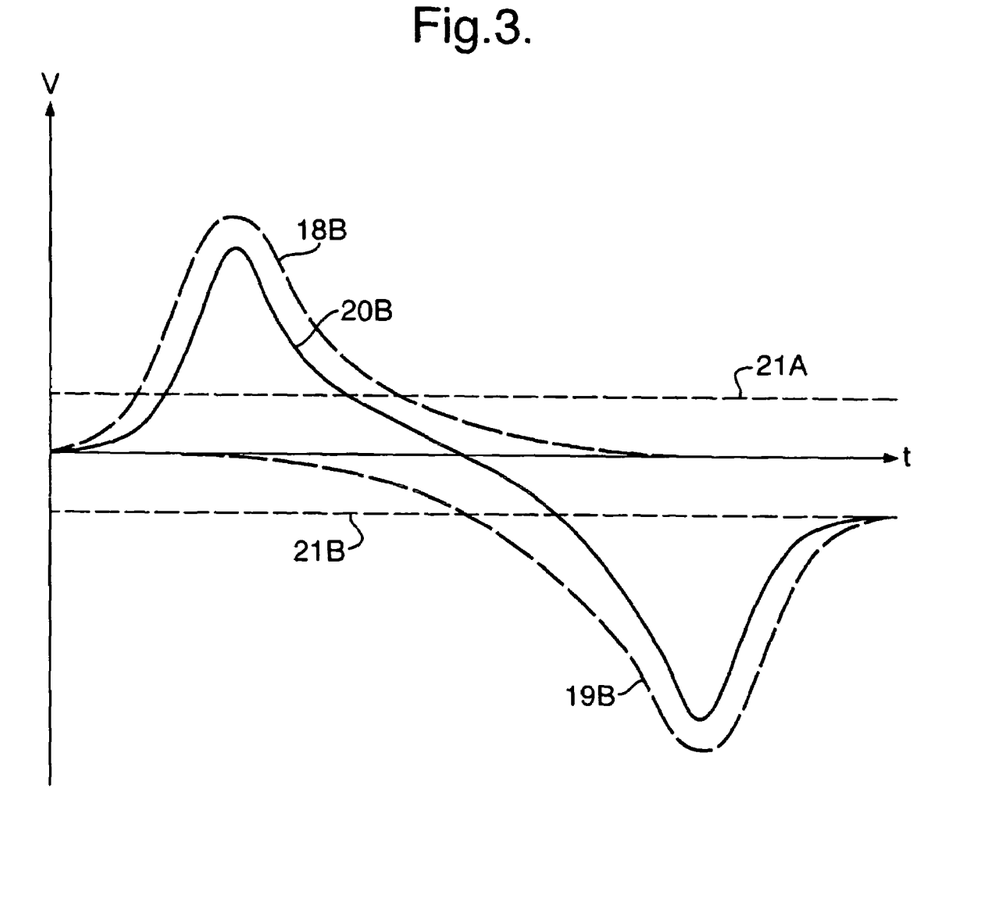
FIG. 3 shows graphs of voltage against time for EMFs induced the FIG. 2 coil when metal objects move past the coil.

FIG. 3 shows graphs 18B, 19B, 20B of voltage against time for EMFs induced in the coil 14A when a metal object is conveyed over it along paths 18A, 19A, 20A respectively, as shown in FIG. 2. If the object passes along paths such as 18A or 19A shown in FIG. 2, i.e. directly underneath one of the coil portions 15, 16, then an EMF having a corresponding polarity is induced, as shown by graphs 18B and 19B respectively. Signal 19B occurs later in time than signal 18B due to the displacement of the coil portion 15 in the $\hat{a}$ direction with respect to the coil portion 16. If the object passes along a path such as 20A in FIG. 2, the temporal form of the induced EMF is as shown by graph 20B in FIG. 3. The peaks of pulses 18B, 19B, and those of graph 20B, have a temporal separation (s+x)/v, where v is the velocity of the belt 11. The other receiver coils 14B, 14C, 14D respond to metallic objects moving on the conveyor belt 11 in a similar manner. It will be appreciated that the temporal forms of EMFs induced in the receiver coils give information on the position of the metal object across the width of the conveyor belt 11 (i.e. in the $\hat{c}$ direction.) Although the displacement of the coils portions within a detector coil in the $\hat{a}$ direction may be s (so that the coil portions are contiguous in that direction), in practice an additional displacement x is desirable as this provides a larger temporal displacement between signals arising between coil portions. This allows more accurate positional information to be obtained relating to the position of a metal object in the input stream. A useful range of values for x is $$0 < x < \frac{s}{2}.$$

Figure 4:
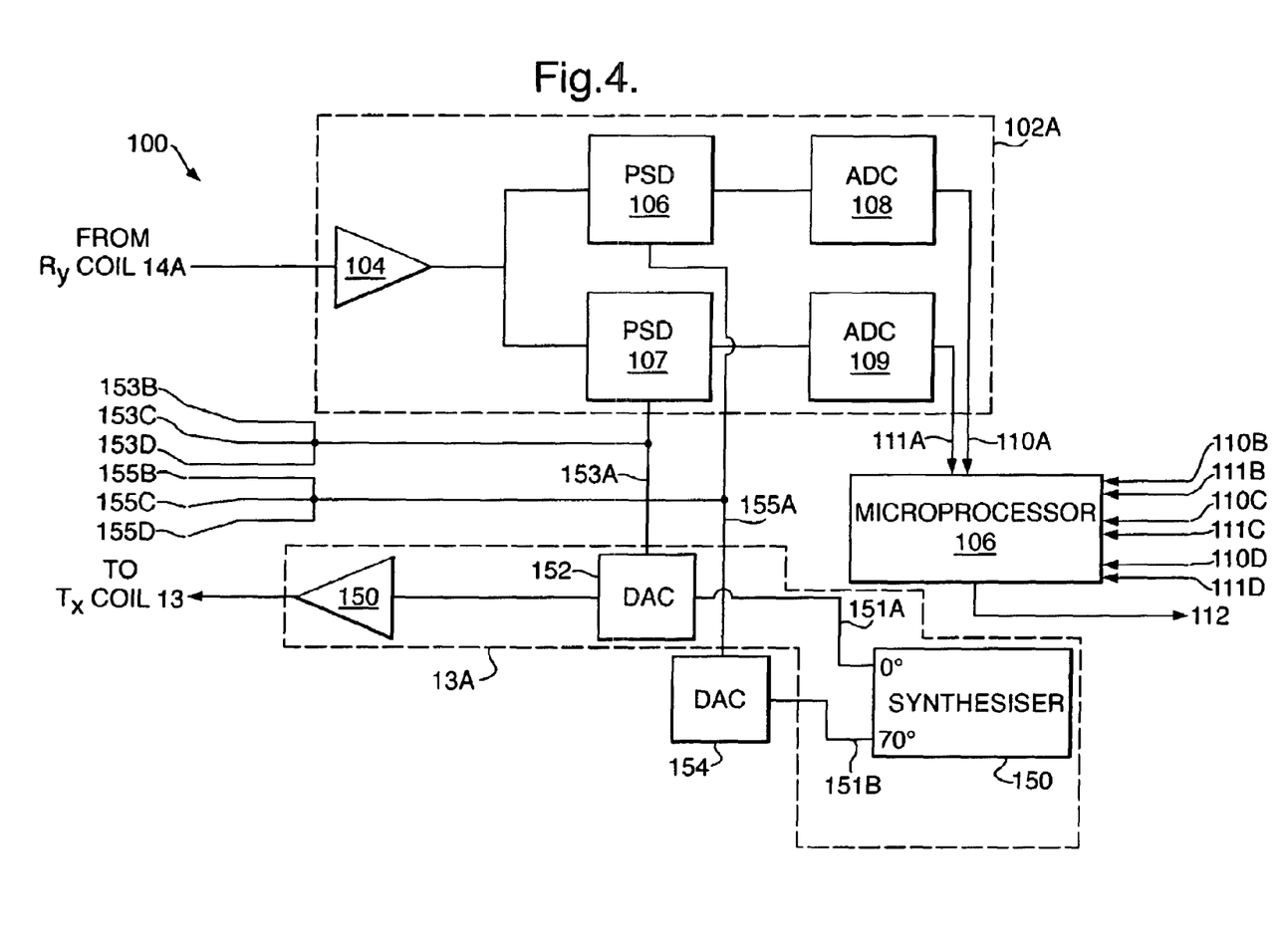
FIG. 4 shows electronic processing hardware comprised in the FIG. 1 apparatus.

FIG. 4 schematically illustrates electronic processing hardware 100 comprised in the apparatus 10. The hardware 100 receives signals from the receiver coils 14A, 14B, 14C, 14D, processes them to establish the positions of metal objects on the conveyor belt 11 and provides corresponding control signals for controlling the rejection means of the apparatus 10.

Referring to FIG. 4, output signals from the receiver coil 14A are passed to a circuit module 102A. Module 102A comprises a pre-amplifier 104, phase sensitive detectors (PSDs) 106, 107, and analogue-to-digital converters (ADC) 108, 109. Outputs 110A, 111A from ADCs 108, 109 respectively of the module 102A are input to a microprocessor 106. The hardware 100 comprises three further such circuit modules (not shown), associated with receiver coils 14B, 14C, 14D and having outputs 110B, 111B, 110C, 111C, 110D, 111D which are also input to the microprocessor 106.

Signals for the transmitter coil 13 are digitally synthesised by a signal synthesiser 150 which has a first (0°) output 151A connected to the transmitter coil 13 via a digital-to-analogue converter (DAC) 152 and an amplifier 156. The signal synthesiser 13 has a second (90°) output 151B for providing a signal identical to that from the output 151A, except that it is phased-shifted with respect to the signal at 151A by 90°. The 90° output 151B is connected to a DAC 154. Analogue outputs 153A, 155A of the DACs 152, 154 are connected to PSDs 107, 106 respectively within the circuit module 102A. Further analogue outputs 153B, 153C, 153D and 155B, 155C, 155D are connected to PSDs such as 107, 106 within circuit modules (not shown) associated with receiver coils 14B, 14C, 14D.

The electronic processing hardware 100 operates as follows. Voltage signals from receiver coil 14A are amplified by pre-amplifier 104 and input to PSDs 106, 107. An analogue form of the transmitter signal is also input to PSD 107, and an analogue transmitter signal phase-shifted by 90° is also input to PSD 106, for use as reference pulses. Signals output from the PSDs 106, 107 correspond respectively to the imaginary and real parts of the signal received from coil 14A, and are digitised by ADCs 108, 109 and passed to the microprocessor 106. Digital output signals from circuit modules associated with the receiver coils 14B, 14C, 14D are also passed to the microprocessor 106.

Figure 5:
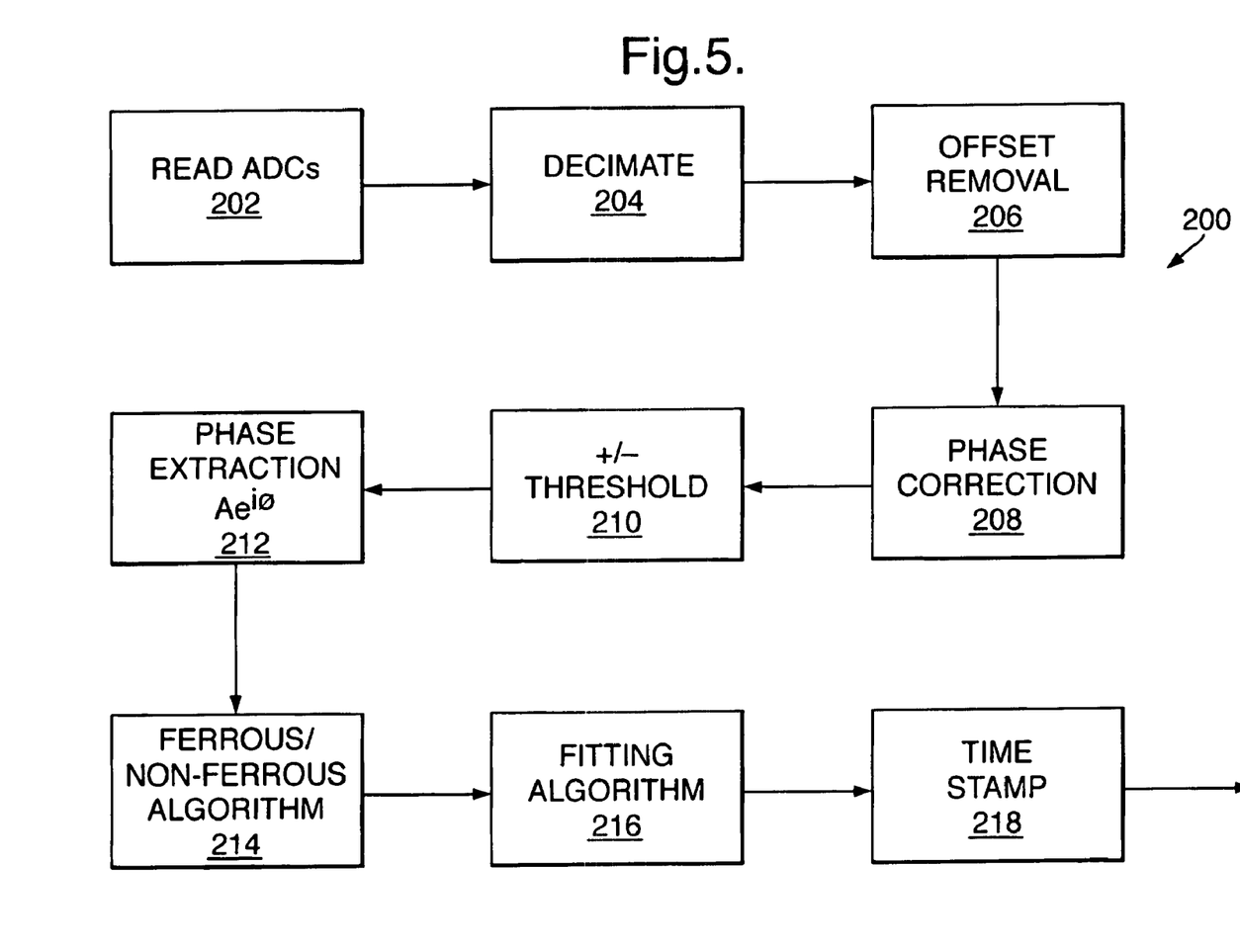
FIG. 5 shows a software flow diagram illustrating processing steps implemented in software by the FIG. 4 hardware.

FIG. 5 shows a software block-diagram illustrating processing of signals received from circuit modules, such as 102A, associated with each of the receiver coils 14A, 14B, 14C, 14D, within the microprocessor 106. Two digital output signals from the ADCs within a circuit module associated with a particular receiver coil are first read (202) and then decimated (204) to produce a signal of reduced bandwidth.

Each digital signal has an unwanted dc offset due to slight imbalance between the coil portions of a given detector coil, as well as inherent offsets in the circuit modules. These are removed with a simple algorithm (206) well-known to those skilled in the art.

Phase correction (208) is then carried out to compensate for phase shifts within the analogue electronics associated with the transmitter coil and within the circuit modules. This is achieved by a calibration procedure (carried out before the apparatus 10 is operated) in which an object of known phase response is placed near each receiver coil in turn. Two signals, orthogonal in phase, are recorded from each circuit modules (e.g. 102A) and a simple rotation matrix can adjust the phase of the calibration signal to any chosen value. A suitable calibration target is non-conducting ferrite, as this has a zero phase response to a transmitted magnetic field.

Predetermined thresholds (21A, 21B in FIG. 3) are compared to the signal to determine whether the signal is stronger than a threshold. The thresholds 21A, 21B are set so that noise, and metal objects too small to be of interest, are rejected (210).

The phase of the signal from the receiver coil with respect to the transmitted signal is then established (212); this may be used identify the particular metal involved. A known algorithm (214) then establishes whether the metal is ferrous or non-ferrous. A fitting algorithm (216) may then used to establish the position of a metal object across the width of the conveyor belt 11 to a greater precision than the separation of coil portions in the ĉ direction. Data generated by the microprocessor 106 regarding the nature and position of metal objects on the conveyor belt 11 is time-stamped (218) and may be passed to rejection means to effect separation of metal objects in the input stream on the conveyor belt 11.

Signals output from each of the receiver coils 14A, 14B, 14C, 14D are processed in a common manner.

Although the apparatus 10 comprises a transmitter coil, this is not essential in all circumstances. For example, if it is desired to only to extract ferrous objects from the input stream, this may be achieved by subjecting the input stream to a magnetic field before it enters the apparatus 10. Magnetised ferrous objects may then induce signals in the receiver coils by virtue of relative movement between the objects and the receiver coils, obviating the need for a transmitter coil. Where a transmitter coil is used, a single coil arranged around all the receiver coils is particularly advantageous in terms of reduced cost and complexity, although the use of individual transmitter coils with the receiver coils is also possible. Where a transmitter coil is used, neither ferrous nor non-ferrous objects need to be moving with respect to the detector coils in order to be detected, although obviously in the processing of a continuous input stream this is desirable, and it is immaterial whether the waste stream moving with respect to static detecting coils or whether the detecting coils are moved with respect to a static waste stream.

Although the use of printed circuit boards mentioned above is particularly convenient, it is not essential. The differential receiver coils may be formed in a more conventional manner by winding wire onto one or more formers.

In a variant of the apparatus 10, the coil portion 15 is offset with respect to the coil portion 16 by a distance s+x (x=s/4) in the â direction, and also by a distance s/2 in the ĉ direction, and remaining detector coils of the variant apparatus are similarly arranged. Detector coils in the variant apparatus provide a greater spatial resolution (s/2) although for a given conveyor belt width, a greater number of individual detector coils is required than is the case in the apparatus 10, in which coil portions are offset in the ĉ direction by a distance s.

Some of the geometries discussed above are summarised in Table 1 below.

TABLE 1

| $B_p \cdot \hat{a}$ | $B_p \cdot \hat{c}$ | $\cos^{-1} \hat{a} \cdot \hat{b}$ |
|---|---|---|
| s | s | 45.0° |
| s | s/2 | 26.5° |
| 5s/4 | s | 38.6° |
| 5s/4 | s/2 | 21.8° |
| 3s/2 | s | 33.7° |
| 3s/2 | s/2 | 18.4° |

Figure 6:
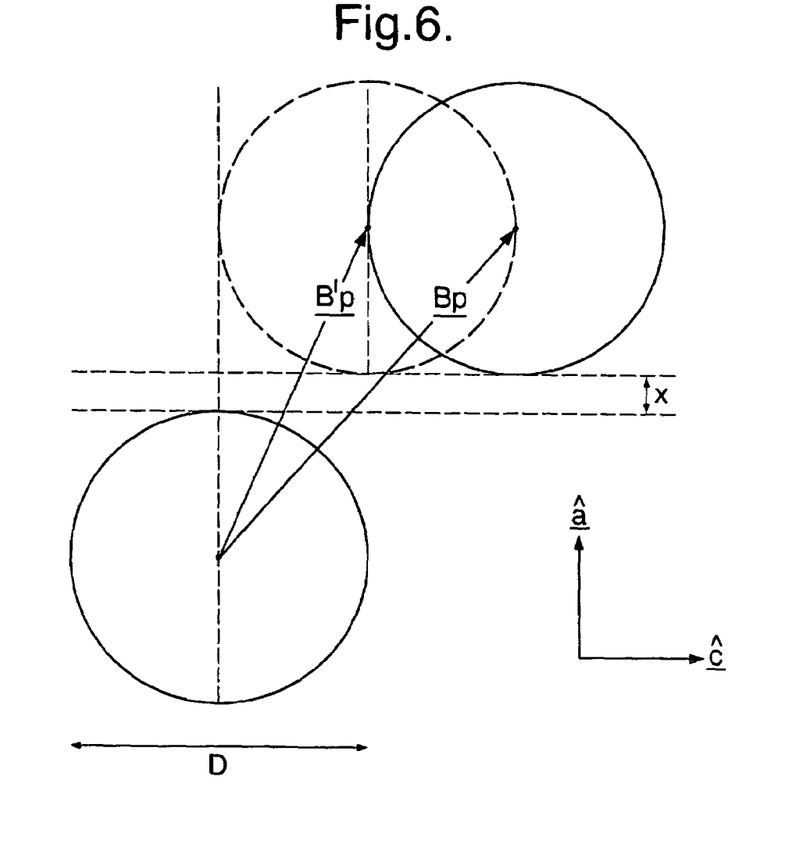
FIG. 6 shows two possible arrangements of a differential metal-detecting coil for two other embodiments of the invention.
Figure 6A:
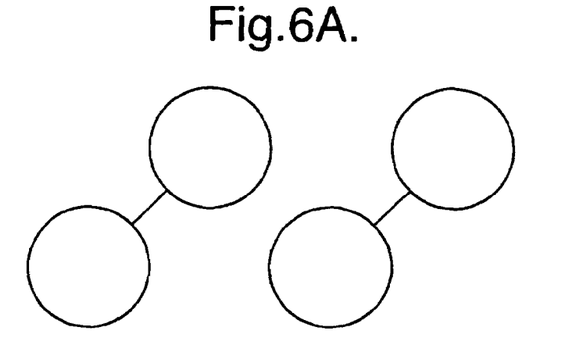
FIGS. 6A, 6B indicate the arrangement of adjacent metal-detecting coils corresponding to the FIG. 6 configurations.
Figure 6B:
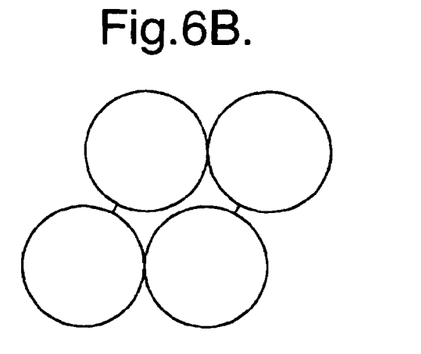
Figure 7:
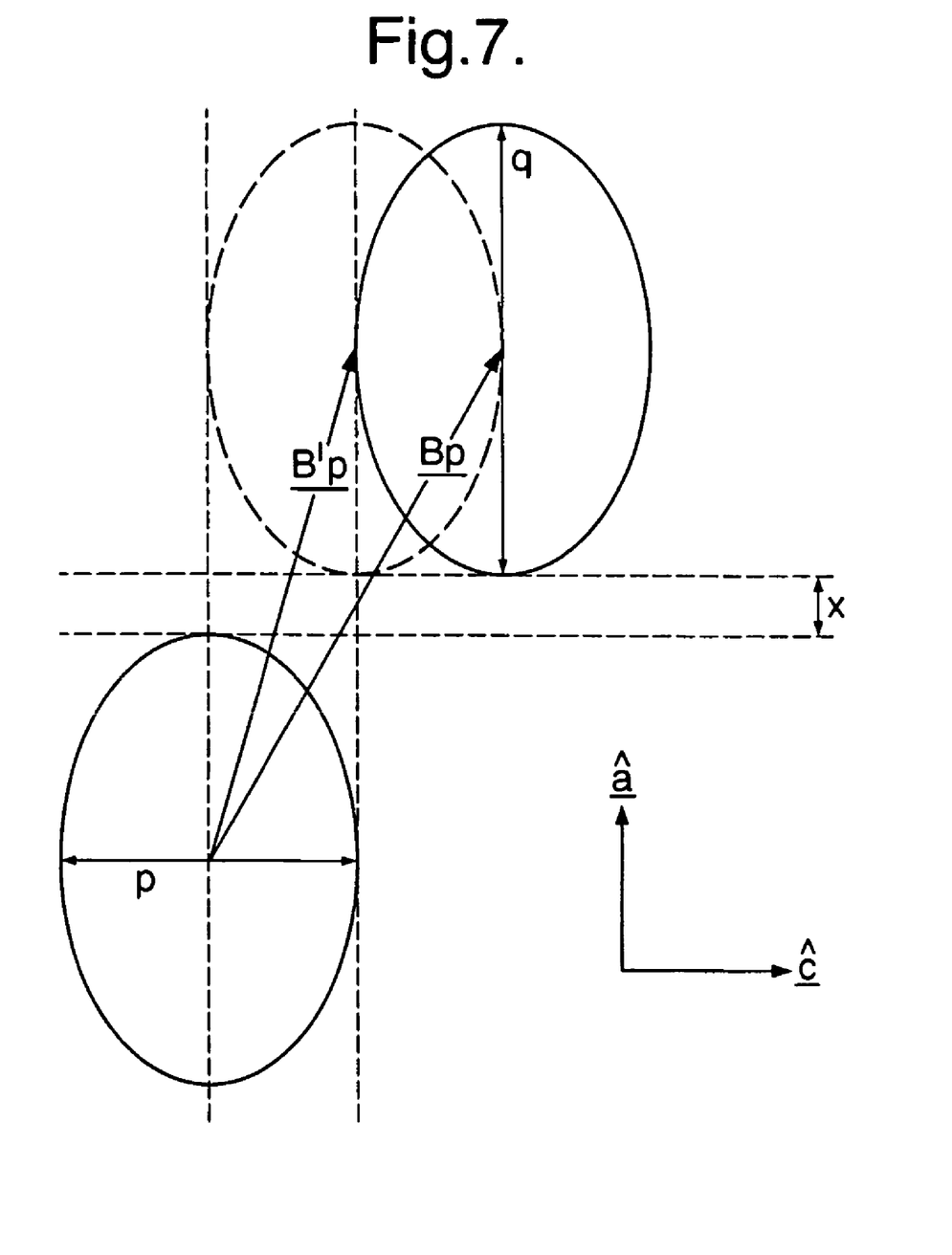
FIG. 7 shows two possible arrangements of a differential metal-detecting coil for two further embodiments of the invention.

In other embodiments of the invention, the coil portions of the differential receiver coils may have shapes other than square. FIG. 6 indicates two possible arrangements of circular coil portions of a differential receiver coil in which $B_p \cdot \hat{c}$ equals D or D/2 (D is the diameter of a circular coil portion.) FIGS. 6A and 6B show how consecutive detectors coils would be arranged in the first and second of these cases respectively. FIG. 7 illustrates two possible arrangements for differential receiver coil having elliptical coil portions.

Generally, in embodiments of the invention, the coil portions of a differential receiver coil need to be of generally similar size and shape, and provided $$0 < \cos^{-1} \hat{a} \cdot \hat{b} < \frac{\pi}{2}$$

the benefits of the invention are achieved, i.e. even if the coil portions of respective receiver coils overlap in a plane parallel to that of the conveyor belt 11. However it is preferable that B is such that B·ĉ is either s or s/2, where s is the approximate dimension of a coil portion in the ĉ direction, and simultaneously B·â>t, where t is the approximate dimension of a coil portion in the â direction, as this simultaneously provides a significant detecting width across the conveyor belt and an output signal from which the position of a metal object across the belt 11 can be accurately obtained.

Also it will be appreciated that the planes of the coil portions of a receiver coil must be arranged so that there is flux linkage sufficient to generate a useful signal in the receiver coil when a metal object is conveyed past it. For example, if it is desired to detect and separate ferrous objects only, these objects may be magnetised in a direction normal to the plane of FIG. 1, prior to their passage past the detector array; the planes of the coil portions of the receiver coils are then preferably substantially parallel to the plane of the conveyor belt 11.

The detector array may also be positioned above the conveyor belt 11, rather than below it, although in that case it would need to be ensured that the spacing between the belt 11 and the array was sufficient to allow the passage of objects comprised in the input stream.

Although the foregoing description relates to CW metal-detection, other embodiments of the invention may employ pulse-induction detection. In such embodiments, the metal-detecting coils would have the same configuration but the electronic processing hardware would be adapted to this other method of metal-detection.

The invention claimed is:

1. Apparatus for establishing the positions of metal objects in a mixed input stream of both metal and non-metal objects, the apparatus comprising a differential metal-detecting coil having a first coil portion wound in a first sense and a second coil portion of generally similar shape and size to the first, wound in a second sense opposite to the first sense, and conveying means for moving objects with respect to, and past, the differential metal-detecting coil in a plane and in a direction with unit vector â, characterised in that the second coil portion is displaced from the first coil portion by a displacement B having a component in the plane in a direction with unit vector b̂, wherein $$0 < \cos^{-1} \hat{a} \cdot \hat{b} < \frac{\pi}{2},$$

and in that the apparatus further comprises a signal processor for analysing the form of the output voltage of the coil as a function of time to establish the position of said metal objects in a direction ĉ in the plane, where ĉ is defined by â·ĉ=0.

2. Apparatus according to claim 1 wherein B·â≧t, where t is the dimension of a coil portion in the â direction, and $$\frac{s}{2} \leq B \cdot \hat{c} \leq s,$$

where s is the dimension of a coil portion in a direction with unit vector ĉ defined by â·ĉ=0.

3. Apparatus according to claim 1 wherein the signal processor is arranged to distinguish voltages of different polarities, and to associate voltages of a first polarity with one coil portion and voltages of a second polarity, opposite to the first, with the other coil portion.

4. Apparatus according to claim 1 and comprising a plurality of differential metal-detecting coils arranged in a linear array substantially in the ĉ direction.

5. Apparatus according to claim 4 and further comprising a single transmitter coil arranged around the differential metal-detecting coils.

6. Apparatus according to claim 4 wherein the differential metal-detecting coils are each formed on a printed circuit board (PCB).

7. Apparatus according to claim 6 wherein the differential metal-detecting coils are formed on a single PCB.

8. Apparatus according to claim 7 wherein a single transmitter coil is formed on the PCB around the differential metal-detecting coils.

9. Apparatus according to claim 8 wherein the signal processor comprises electronic hardware co-located with said coils on the single PCB.

10. A method of establishing the positions of metal objects in a mixed input stream of both metal and non-metal objects, characterised in that the method comprises use of apparatus according to claim 1.

11. A metal-detector array system comprising a plurality of differential metal-detecting coils, the array extending in a direction with unit vector x̂, and each metal-detecting coil having a first coil portion wound in a first sense and a second coil portion of generally similar shape and size to the first, wound in a second sense opposite to the first sense, characterised in that, in at least one metal-detecting coil, the second coil portion thereof is displaced from the first coil portion thereof by a displacement B such that the two coil portions are substantially in the same plane and $$0 < \cos^{-1}\hat{b}\cdot\hat{x} < \frac{\pi}{2}$$

where $\hat{b}$ is a unit vector defined by $B\cdot\hat{b}=|B|$, and in that the system further comprises, in respect of that or those metal-detecting coil or coils, a signal processor for analysing the form of the output voltage of the coil or coils as a function of time to establish the position, along the direction $\hat{x}$, of metal objects when said objects are moving past the array substantially in a direction with unit vector $\hat{y}$ where $\hat{x}\cdot\hat{y}=0$.

* * * * *